(12) United States Patent
Xiao et al.

(10) Patent No.: US 11,966,056 B2
(45) Date of Patent: Apr. 23, 2024

(54) AUGMENTED REALITY DEVICE AND OPTICAL SYSTEM THEREOF

(71) Applicant: Matrixed Reality Technology Co., Ltd., Wuxi (CN)

(72) Inventors: Bing Xiao, Beijing (CN); Chi Xu, Beijing (CN)

(73) Assignee: Matrixed Reality Technology Co., Ltd., Wuxi (CN)

( * ) Notice: Subject to any disclaimer, the term of this patent is extended or adjusted under 35 U.S.C. 154(b) by 699 days.

(21) Appl. No.: 17/257,455

(22) PCT Filed: Sep. 10, 2019

(86) PCT No.: PCT/CN2019/105027
§ 371 (c)(1),
(2) Date: Dec. 31, 2020

(87) PCT Pub. No.: WO2020/052535
PCT Pub. Date: Mar. 19, 2020

(65) Prior Publication Data
US 2021/0173216 A1    Jun. 10, 2021

(30) Foreign Application Priority Data
Sep. 10, 2018 (CN) .......................... 201811050224.8

(51) Int. Cl.
*G02B 27/01* (2006.01)
*G02B 27/28* (2006.01)

(52) U.S. Cl.
CPC ....... *G02B 27/0172* (2013.01); *G02B 27/283* (2013.01); *G02B 2027/0178* (2013.01)

(58) Field of Classification Search
CPC .............. G02B 27/0172; G02B 27/283; G02B 2027/0178

(Continued)

(56) References Cited

U.S. PATENT DOCUMENTS 5,596,451 A    1/1997    Handschy et al.
8,570,656 B1   10/2013   Weissman
(Continued)

FOREIGN PATENT DOCUMENTS

CN    105388625 A    3/2016
CN    108181709 A    6/2018
(Continued)

OTHER PUBLICATIONS

Communication pursuant to Article 94(3) EPC received in the corresponding European application 19859108.3, dated Sep. 13, 2023.

(Continued)

*Primary Examiner* — Joseph P Martinez
*Assistant Examiner* — Grant A Gagnon

(57) ABSTRACT

The present application discloses an augmented reality apparatus and an optical system thereof. The optical system includes an image source; a bandpass polarizing beam splitter, relative to the image source, defining a beam splitting side adjacent to the image source and a transmission side facing away from the image source, the bandpass polarizing beam splitter being configured to allow polarization splitting of light incident thereon in a given wavelength range and allow transmission of light out of the given wavelength range; a wave plate adjacent to the beam splitting side; and a curved bandpass semi-reflector located downstream of the wave plate in a path of the reflected light and configured to allow reflection of light incident on the curved bandpass semi-reflector in the given wavelength range and allow transmission of light out of the given wavelength range.

20 Claims, 8 Drawing Sheets

Figure 1:
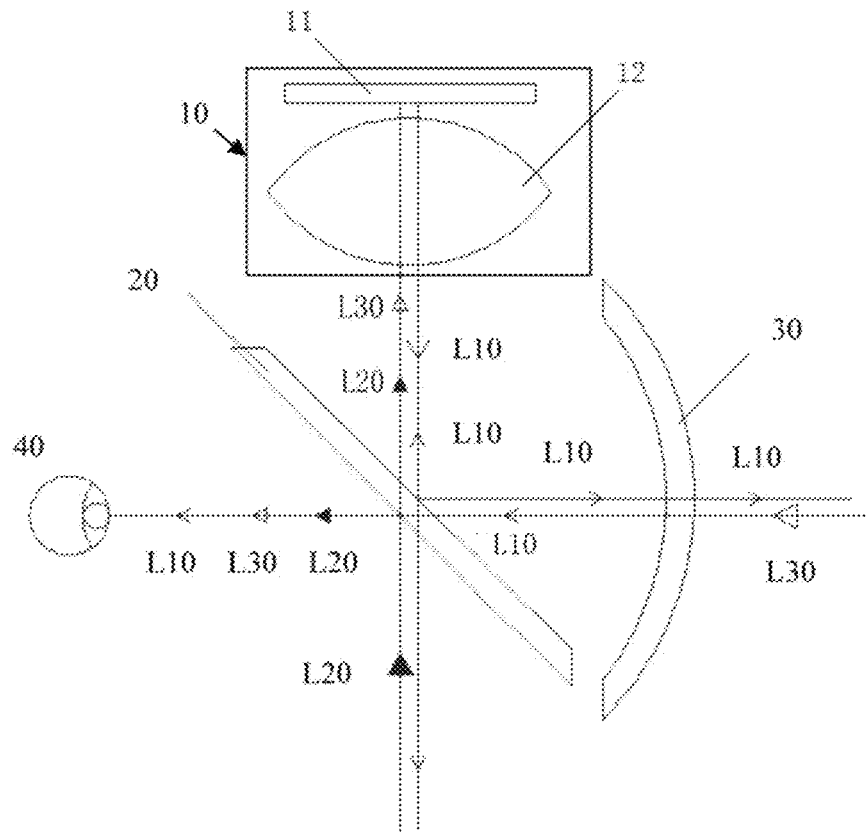

(58) Field of Classification Search
USPC .......................................................... 359/489
See application file for complete search history.

(56) References Cited

U.S. PATENT DOCUMENTS

| | | |
|---|---|---|
| 2005/0243433 A1 | 11/2005 | Cado et al. |
| 2017/0219826 A1 | 8/2017 | Haseltine et al. |
| 2017/0255017 A1 | 9/2017 | Haseltine |

FOREIGN PATENT DOCUMENTS

| | | |
|---|---|---|
| CN | 108319018 A | 7/2018 |
| CN | 108897136 A | 11/2018 |
| WO | 2020/206631 A1 | 10/2020 |

OTHER PUBLICATIONS

Erdogan Turan: "Optical Filters: Non-normal Angles of Incidence", May 31, 2011, XP093079815, Retrieved from the Internet: URL:https://www.idex-hs.com/docs/default-source/resources/non-normalanglesofincidence.pdf?sfvrsn=f95d3f25_3.
First Office Action received in the corresponding Chinese Application 201811050224.8, dated Sep. 29, 2023.

AUGMENTED REALITY DEVICE AND OPTICAL SYSTEM THEREOF

CROSS-REFERENCE TO RELATED APPLICATIONS

The present application is a national phase entry under 35 USC § 371 of International Application PCT/CN2019/105027, filed on Sep. 10, 2019, which claims the benefit of and priority to Chinese Patent Application No. 201811050224.8, filed on Sep. 10, 2018, the entire disclosures of which are incorporated herein by reference.

FIELD

The disclosure relates generally to the field of augmented reality imaging, particularly, to an augmented reality (AR) apparatus, and more particularly, to a wearable AR apparatus and an optical system of the wearable AR apparatus.

BACKGROUND

Augmented reality technology can be called as mixed display technology. Its principle is that an image source controllable by a computer is used to present an image, which is displayed for a user, to eyes of the user, and the presented image is superimposed with a real-world environmental image which can be directly seen by the eyes of the user so that real-world scene information augmented with the image presented via the computer is provided for the user. This kind of technology plays an increasingly important role in facilitating design and development of industrial products by designers.

When designing an optical system of the AR apparatus, one focuses on how to increase the efficiency of energy utilization of the image source, i.e. how to increase the brightness of the image presented to the eyes of the user, how to increase light transmittance so that more clear real-world scene can be watched by the user's eyes, and how to improve interactivity between the user and a person in the real-world environment, i.e. how to enable the person to notice eye changes of the user more clearly.

SUMMARY

According to an aspect of the present application, an optical system for an augmented reality apparatus is provided, which optical system includes: an image source; a bandpass polarizing beam splitter, relative to the image source, defining a beam splitting side adjacent to the image source and a transmission side facing away from the image source, the bandpass polarizing beam splitter being configured to perform polarization splitting on light incident thereon in a given wavelength range and allow transmission of light out of the given wavelength range; a wave plate adjacent to the beam splitting side, and the beam splitter being configured to allow light emitted from the image source to be non-perpendicularly incident on the beam splitting side and be at least partially reflected towards the wave plate; and a curved bandpass semi-reflector located downstream of the wave plate in a path of reflected light and configured to allow reflection of light incident on the curved bandpass semi-reflector in the given wavelength range and allow transmission of light out of the given wavelength range.

According to another aspect of the present application, an augmented reality apparatus, particularly a head-mounted augmented reality apparatus, is provided, which apparatus includes a holder and an optical system integrated in the holder. The optical system integrated includes: an image source; a bandpass polarizing beam splitter, relative to the image source, defining a beam splitting side adjacent to the image source and a transmission side facing away from the image source, the bandpass polarizing beam splitter being configured to perform polarization splitting on light incident thereon in a given wavelength range and allow transmission of light out of the given wavelength range, the bandpass polarizing beam splitter including a beam splitter substrate and a bandpass polarizing beam splitting film attached on the beam splitter substrate, each film structure including a first material layer of a first refractive index and a second material layer of a second refractive index, the first refractive index being lower than the second refractive index, and the first material layer being adjacent to the image source, and the second material layer being away from the image source; a wave plate adjacent to the beam splitting side, and the beam splitter being configured to allow light emitted from the image source to be non-perpendicularly incident on the beam splitting side and be at least partially reflected towards the wave plate; and a curved bandpass semi-reflector located downstream of the wave plate in a path of reflected light and configured to allow reflection of light incident on the curved bandpass semi-reflector in the given wavelength range and allow transmission of light out of the given wavelength range, the curved bandpass semi-reflector including a semi-reflector substrate and a bandpass semi-reflective film attached on the semi-reflector substrate, the film structure including a third material layer of a third refractive index and a fourth material layer of a fourth refractive index, the third refractive index being lower than the fourth refractive index, the third material layer being adjacent to the bandpass polarizing beam splitter or the wave plate, and the fourth material layer being away from the bandpass polarizing beam splitter or the wave plate.

According to still another aspect of the present application, an optical system for an augmented reality apparatus is provided and includes: an image source; a bandpass polarizing beam splitter, relative to the image source, defining a beam splitting side adjacent to the image source and a transmission side facing away from the image source, the bandpass polarizing beam splitter being configured to perform polarization splitting on light incident thereon in a given wavelength range and allow transmission of light out of the given wavelength range, the bandpass polarizing beam splitter including a beam splitter substrate and a bandpass polarizing beam splitting film attached on the beam splitter substrate, each film structure including a first material layer of a first refractive index and a second material layer of a second refractive index, the first refractive index being lower than the second refractive index, and the first material layer being adjacent to the image source, and the second material layer being away from the image source, a thickness of each of the first material layer and the second material layer being determined depending on a wavelength or an integer fraction of at least one of a wavelength of red light, a wavelength of green light, and a wavelength of blue light; a wave plate adjacent to the beam splitting side, and the beam splitter being configured to allow light emitted from the image source to be non-perpendicularly incident on the beam splitting side and be at least partially reflected towards the wave plate; and a curved bandpass semi-reflector located downstream of the wave plate in a path of reflected light and configured to allow reflection of light incident on the curved bandpass semi-reflector in the given wavelength range and allow transmission of light out of the given wavelength range.

DRAWINGS

The foregoing and other aspects of the present application will be well understood by the following explanations accompanying with the drawings. It should be noted that for clarity the drawings might be given in different proportions, which will not affect understanding to the present application. In the drawings:

FIG. 1 schematically illustrates a light path chart of an optical system of an existing AR apparatus.

Figure 2:
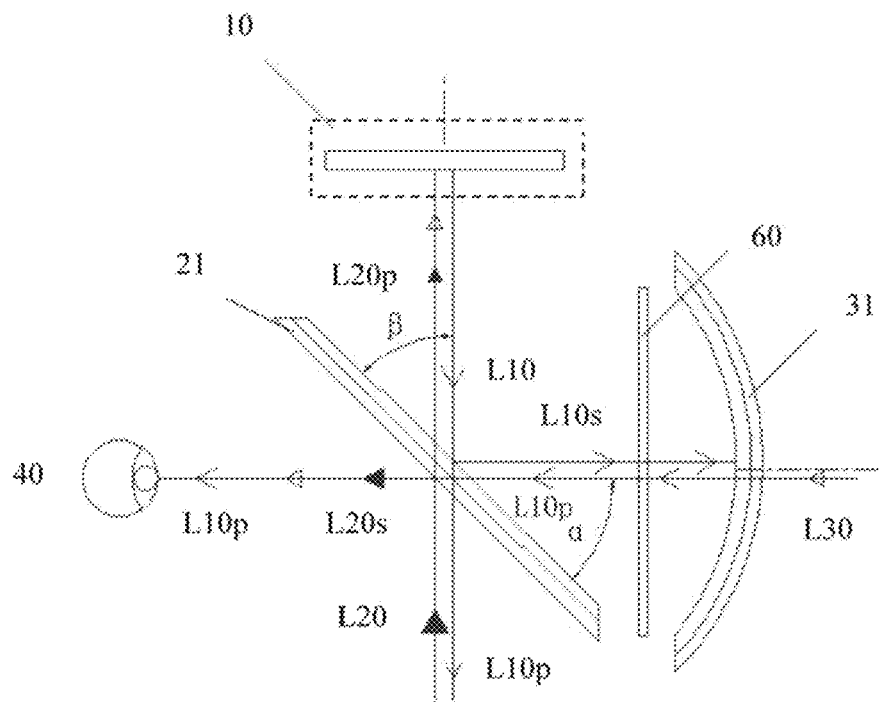

FIG. 2 schematically illustrates a light path chart of an optical system according to an embodiment of the present application.

Figure 3:
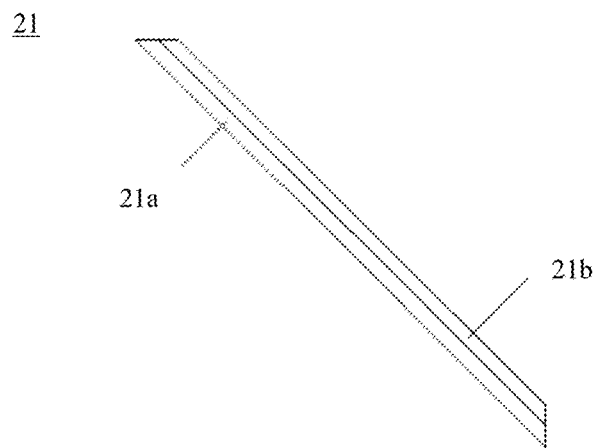

FIG. 3 schematically illustrates a cross-sectional view of a bandpass polarizing beam splitter according to an embodiment of the present application used in an optical system.

Figure 4:
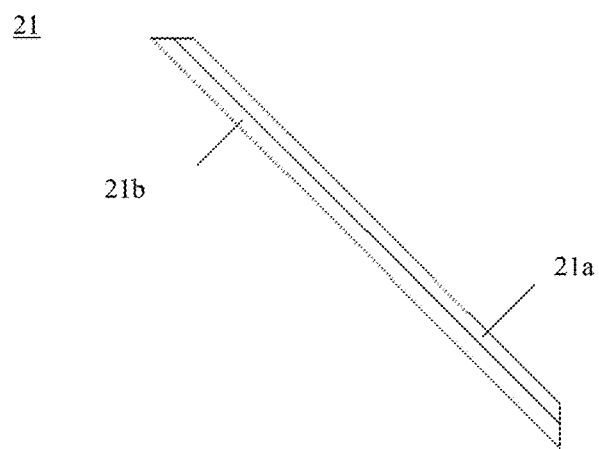

FIG. 4 schematically illustrates a cross-sectional view of a bandpass polarizing beam splitter according to another embodiment of the present application.

Figure 5:
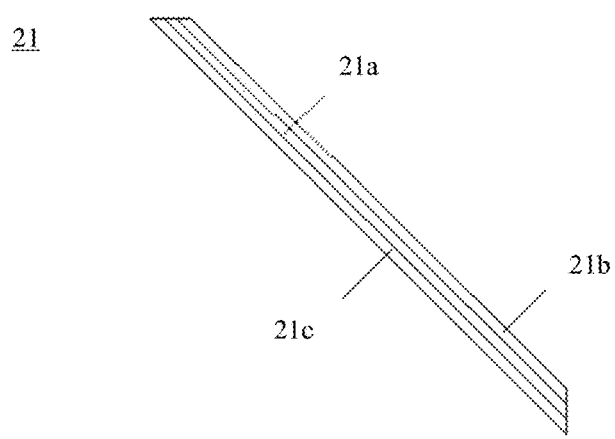

FIG. 5 schematically illustrates a cross-sectional view of a bandpass polarizing beam splitter according to another embodiment of the present application.

Figure 6:
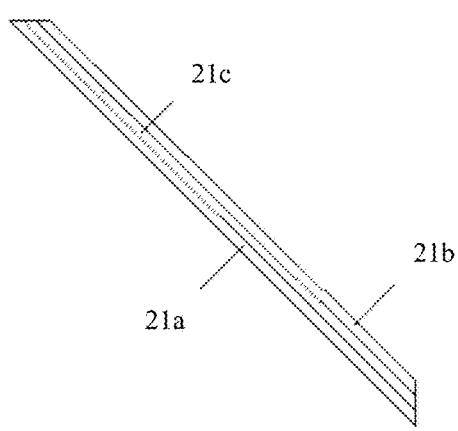

FIG. 6 schematically illustrates a cross-sectional view of a bandpass polarizing beam splitter according to another embodiment of the present application.

Figure 7:
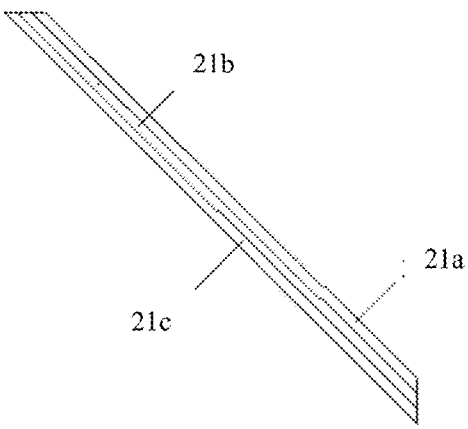

FIG. 7 schematically illustrates a cross-sectional view of a bandpass polarizing beam splitter according to another embodiment of the present application.

Figure 8:
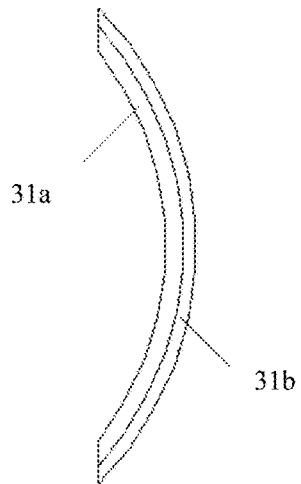

FIG. 8 schematically illustrates a cross-sectional view of a bandpass semi-reflector according to an embodiment of the present application.

Figure 9:
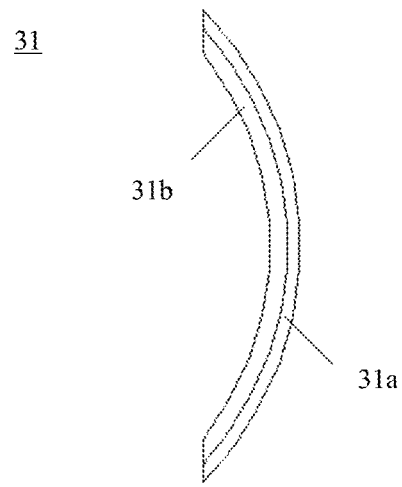

FIG. 9 schematically illustrates a cross-sectional view of a bandpass semi-reflector according to another embodiment of the present application.

Figure 10:
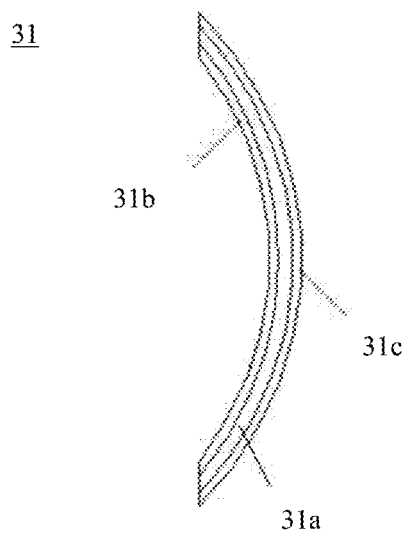

FIG. 10 schematically illustrates a cross-sectional view of a bandpass semi-reflector according to another embodiment of the present application.

Figure 11:
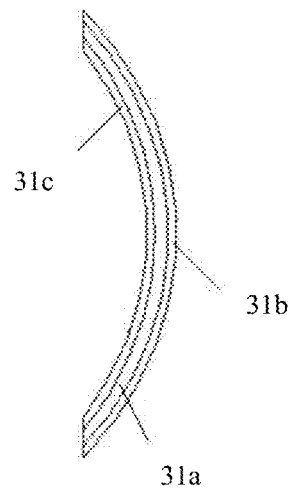

FIG. 11 schematically illustrates a cross-sectional view of a bandpass semi-reflector according to another embodiment of the present application.

Figure 12:
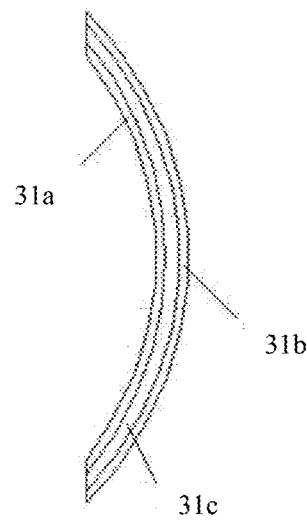

FIG. 12 schematically illustrates a cross-sectional view of a bandpass semi-reflector according to another embodiment of the present application.

Figure 13:
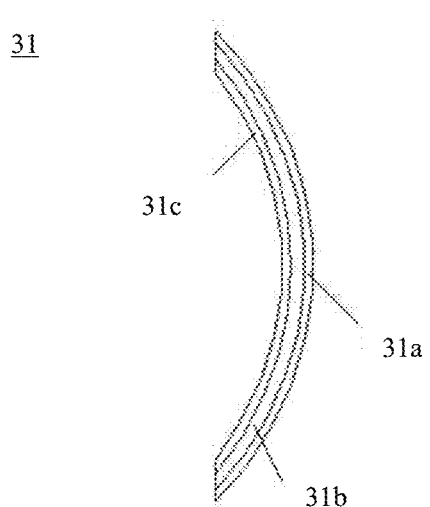

FIG. 13 schematically illustrates a cross-sectional view of a bandpass semi-reflector according to another embodiment of the present application.

Figure 14:
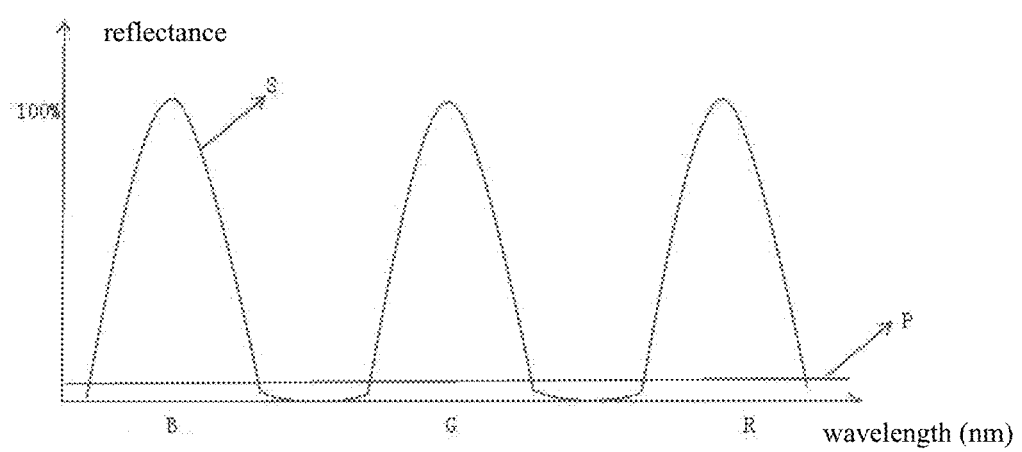
Figure 15:
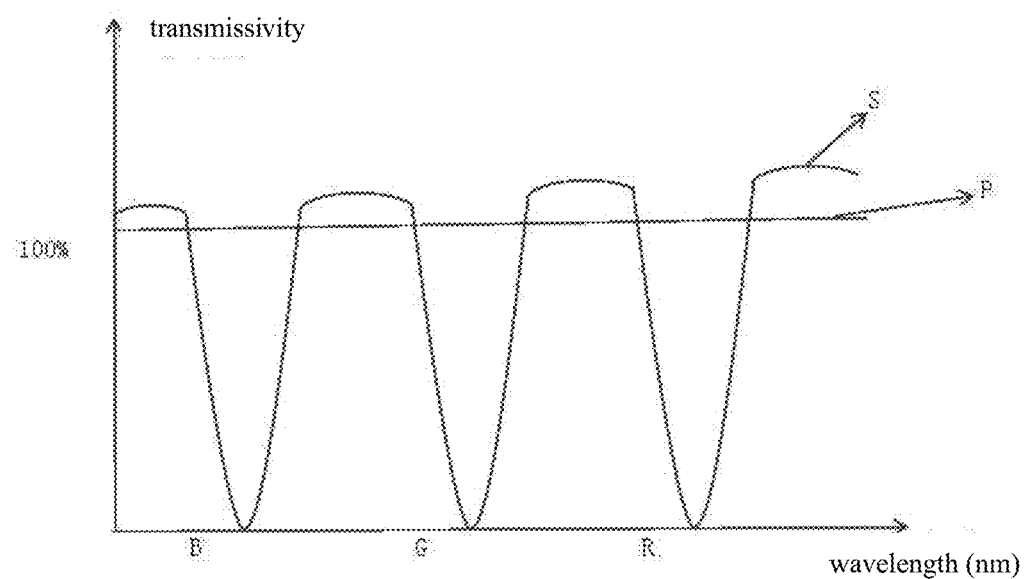
Figure 16:
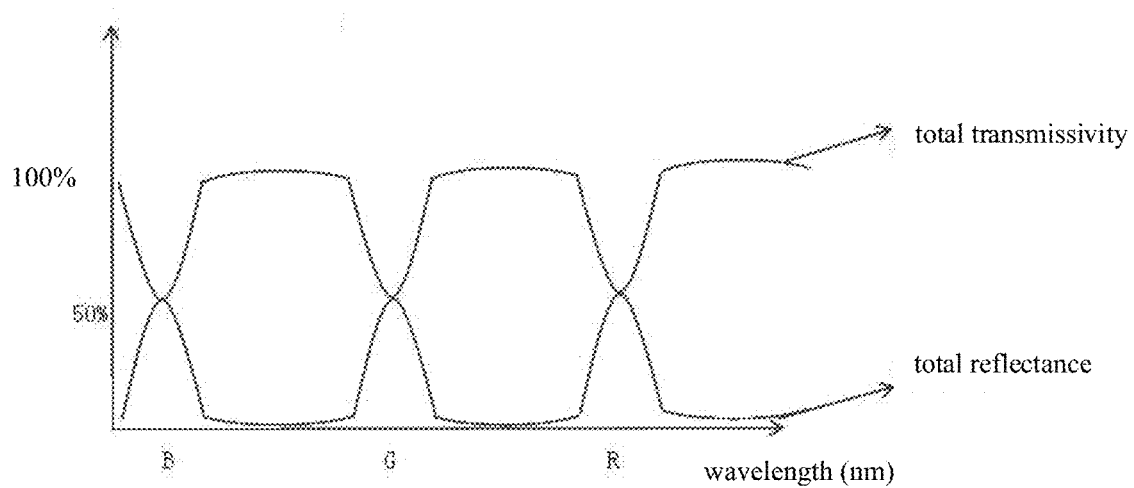

FIGS. 14 to 16 schematically illustrate characteristic diagrams of light of different wavelengths for bandpass polarizing beam splitting films designed according to the present application.

Figure 17:
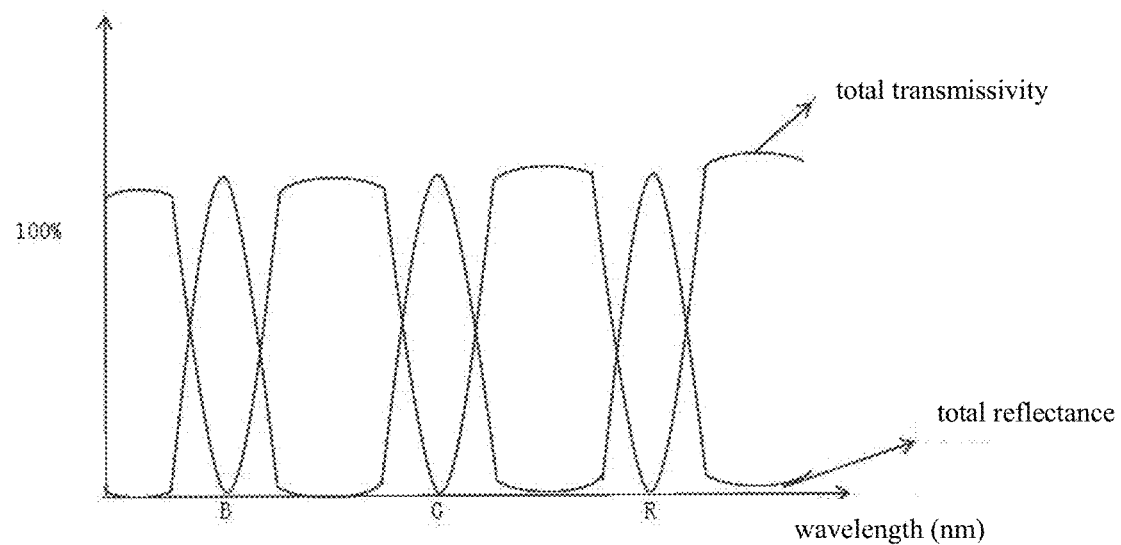

FIG. 17 schematically illustrates a characteristic diagram of light of different wavelengths for a bandpass semi-reflective film designed according to the present application.

Figure 18:
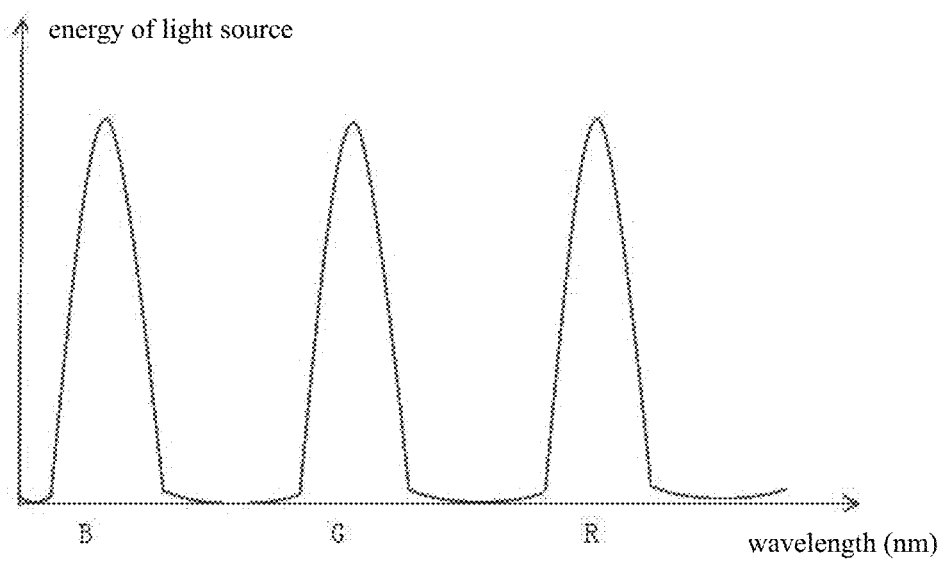

FIG. 18 schematically illustrates spectral power distribution of a narrow-band image source.

DESCRIPTION OF EMBODIMENTS

In the drawings of the present application, features having the same configuration or having a similar function are represented by the same reference numerals respectively.

FIG. 1 schematically illustrates a light path chart of an optical system of an existing augmented reality (AR) apparatus. The optical system of the existing AR apparatus generally includes an image source 10 controllable by a computer (not shown), a beam splitter 20 and a semi-reflector 30. As shown, the image source 10 can include an image source unit 11 capable of emitting light, such as a planar image source, as well as a lens 12 through which light is focused. The semi-reflector 30 can be a planar or curved semi-reflector (which is shown in the drawings as a curved semi-reflector). For instance, the AR apparatus can be a pair of AR glasses, which can be worn on a user's head. The image source unit 11 can be a planar image source such as a flat display or alternatively a curved image source such as a curved display.

Light L10, which is used to exhibit a desired image, can be emitted by the image source 10 under control of a computer. The beam splitter 20 is arranged downstream of the image source 10 along the light L10. A part of the light L10 emitted from the image source is reflected by the beam splitter 20, and another part of the light is transmitted through the beam splitter 20. Along a light path of the reflected light of the light L10 emitted from the image source, the semi-reflector 30 is arranged downstream of the beam splitter 20. The reflected light of the light L10 emitted from the image source is partially transmitted outwards through the semi-reflector 30 and is partially reflected by the same semi-reflector, in which a reflected part of the light partially passes through the beam splitter 20 again to be observed by a human eye. Meanwhile, ambient light L30 can sequentially pass through the semi-reflector 30 and then partially through the beam splitter 20 to be seen by the human eye 40. Therefore, an image presented by a portion of the light L10 emitted from the image source and an environmental image presented by the ambient light L30 are superimposed in the human eye 40 such that the user can experience an augmented reality effect for real-world scene.

When the light L10 emitted from the image source passes through the beam splitter 20, there is loss of energy and thus light energy entering the human eye 40 is reduced, resulting in influence on imaging effect. Moreover, since the light L10 emitted from the image source is partially transmitted outwards through the semi-reflector 30, it is very difficult for the user, who wears the AR apparatus, to interact with someone. This is because one who stands opposite to the user wearing the AR apparatus observes the light L10 emitted from the image source directly through the semi-reflector 30 and thus cannot observe any movements of the human eye 40. Furthermore, there is loss of the ambient light's energy when the ambient light passes through an optical device, resulting in reduction in observation resolution of the human eye to external objects.

In order to solve the above issues, FIG. 2 schematically illustrates a light path chart of an optical system of an AR apparatus according to an embodiment of the present application. The optical system generally includes an image source 10 controllable by a computer (not shown), a bandpass polarizing beam splitter 21, and a curved bandpass semi-reflector 31, and a wave plate 60 is arranged between the bandpass polarizing beam splitter 21 and the curved bandpass semi-reflector 31. Light L10, which is used to exhibit a desired image, is emitted by the image source 10 under control of a computer. The bandpass polarizing beam splitter 21 is arranged at a non-zero angle relative to an optical axis of the image source 10. In the present application, the wave plate 60 is optionally a quarter-wave plate. However, it should be understood by a person of ordinary skill in the art that any other wave plate or film or optical device, which can cause additional optical path difference to exist between two kinds of polarized light perpendicular to each other, can be used in the present application as long as the wave plate or film or optical device can achieve or substantially achieve functions of the technical solutions of the present application.

In the following embodiments of the present application, the image source 10 can includes an integrated light source or a single light source. Examples of the image source can include but is not limited by: organic light-emitting diodes (OLED), liquid crystal on silicon (LCOS), liquid crystal diodes (LCD), Micro-electromechanical Systems (MEMS) based Displays or Digital Micro-mirror Devices (DMD).

It should be noted that in the context of the present application the curved semi-reflector for example can have an optical surface which is partially spherical, partially cylindrical or hemispherical, and the center of curvature of the curved semi-reflector is adjacent to the beam splitter. Furthermore, in the following description, the semi-reflector can be shaped to be partially rotational symmetrical (non-spherical) or have any other suitable surface profile. Furthermore, it should be understood by a person of ordinary skill in the art that the term "semi-reflector" does not mean that half the energy of light incident on it is reflected by and half the energy of the light is transmitted through the semi-reflector. Rather, a ratio between the reflected light amount and the transmitted light amount can for instance depend on the characteristics of the "semi-reflector" itself.

In the embodiments of the present application, the bandpass polarizing beam splitter 21 is configured to allow polarization splitting of light in a given wavelength range (light in a given wavelength passband) and allow transmission or total transmission of light out of the given wavelength range. In an embodiment, the given wavelength range can be a wavelength range of visible light, for example between 380 and 780 nm (nanometers). Correspondingly, the curved bandpass semi-reflector 31 is configured to allow reflection (for example, total reflection or most reflection) of light in the given wavelength range handled by the bandpass polarizing beam splitter 21 and allow transmission or total transmission of light out of the given wavelength range.

Light emitted from the image source has different energies in different wavelength ranges. Generally, the image source can be configured to emit light mainly concentrating in the range of three primary colors including red light (R), green light (G) and blue light (B). In this way, a sum of R, G and B passband widths in which the energy of the light emitted from the image source mainly concentrates is less than a sum of wavelength ranges out of those passband widths. Therefore, according to the embodiments of the present application, using the bandpass polarizing beam splitter 21 and the curved bandpass semi-reflector 31 and utilizing the wave plate 61 can improve light permeability eyes of the user who wears the AR apparatus and observes the real-world environment, and improve external visibility of the user's eyes so as to enable the interactivity to be enhanced, without substantially reducing the efficiency of energy utilization of the light emitted from the image source, as illustrated by FIG. 2.

A plane on which a beam splitting side of the bandpass polarizing beam splitter 21 locates is at a first angle β relative to the normal of the image source, in which the first angle has a value between 11° and 79°, optionally between 20° and 70°, optionally between 30° and 60°, more optionally between 40° and 55°, most optionally between 40° and 50°; and/or a plane on which the beam splitting side of the beam splitter locates is at a second angle α relative to an optical axis of the semi-reflector, in which the second angle is greater than 0 and less than 90°, and the first angle is between the first angle −10° and the first angle +10°. In this way, the utilization efficiency of the beam splitter can be maximized. In the context of the present application, the term "between" relating to a range of values means that both end values of the range shall be considered as well. For instance, "a value A is between a value B and a value C" means that the value A can be the value B, the value C or a value which is greater than the value B and less than the value C.

In the context of the present application, the beam splitting side of the beam splitter refers to a surface or interface, defined by a constituent part of the beam splitter. When the beam splitter is viewed from outside, light, relative to the source, can be incident on the surface or interface so as to enter the beam splitter and can be at least reflected there. A transmission side of the beam splitter refers to a surface or interface, defined by a constituent part of the beam splitter. When the beam splitter is viewed from outside, light, relative to the source, entering the beam splitter through the beam splitting side can be only transmitted through the surface or interface out of the beam splitter. In the illustrated embodiment, the beam splitting side of the bandpass polarizing beam splitter 21 relative to the image source 10 is adjacent to the image source 10, and the transmission side of the bandpass polarizing beam splitter 21 relative to the image source 10 faces away from the image source 10.

As shown by FIG. 2, under control of the computer, the light L10, which is used to exhibit the desired image, can be emitted from the image source 10. After the light is incident on the bandpass polarizing beam splitter 21, since the energy of the light L10 mainly concentrates in passband widths of R, G and B lights, light components with energy in passband widths of R, G and B lights undergo polarization splitting, such that a light component polarized in a first direction is reflected towards the wave plate 60 and a light component polarized in a second direction passes through the bandpass polarizing beam splitter 21 to be transmitted away therefrom. Light components whose energy is outside the passband widths of R, G and B lights completely pass through the bandpass polarizing beam splitter 21 to be transmitted away therefrom. In the present embodiment, the first direction is perpendicular to the second direction. For example, the polarized light in the first direction can be S-polarized light and the polarized light in the second direction can be P-polarized light. Alternatively, by setting material ratio, the polarized light in the second direction can be S-polarized light and the polarized light in the first direction can be P-polarized light.

In this way, after the light L10 emitted from the image source 10 reaches the bandpass polarizing beam splitter 21, a P-polarized light component L10p of the light L10 (having the light energy of the passband widths of R, G and B lights) is transmitted therethrough, and a S-polarized light component L10s of the light L10 (having the light energy of the passband widths of R, G and B lights) is reflected towards the curved bandpass semi-reflector 31 or the wave plate 60. After passing through the wave plate 60, the S-polarized light component L10s is converted into circularly polarized light (or elliptically polarized light) which is then totally reflected or most reflected by the curved bandpass semi-reflector 31. The reflected circularly polarized light (or elliptically polarized light) is converted into a P-polarized light component L10p by the quarter-wave plate 60. Then, the P-polarized light component L10p can be watched by the human eye 40 through the bandpass polarizing beam splitter 21. In the meanwhile, the ambient light L30 is able to pass through the curved bandpass semi-reflector 31 and the wave plate 60 in sequence and is partially transmitted through the bandpass polarizing beam splitter 21 to be watched by the human eye 40. Moreover, unwanted light L20, after being incident on the bandpass polarizing beam splitter 21, is converted into a P-polarized light component L20p transmitted through the bandpass polarizing beam splitter and an S-polarized light component L20s reflected from the bandpass polarizing beam splitter. Only the S-polarized light component L20s can be watched by the human eye 40.

According to the above settings of the present application, due to the existence of the bandpass polarizing beam splitter 21, the utilization efficiency of the major energy of the light source is not substantially reduced. In the meanwhile, cooperation of the curved bandpass semi-reflector 31 with the bandpass polarizing beam splitter 21 results in that the components from the image source are totally reflected towards the human eye 40 in the AR apparatus and most energy of the light components of the ambient light can enter the AR apparatus and thus is watched by the human eye 40. Therefore, the light energy utilization is improved and a more clear real-world scene can be seen by the user's eyes, and meanwhile, external visibility of eyes of the user can be improved such that the interactivity can be enhanced.

The bandpass polarizing beam splitter 21 can include a flat optical beam splitter substrate 21a and a bandpass polarizing beam splitting film 21b attached on the planar optical beam splitter substrate 21a. The optical beam splitter substrate 21a can be a beam splitter sheet well-known in the field of optical design. The bandpass polarizing beam splitting film 21b is configured to allow polarization splitting of light in a given wavelength range (light in a given wavelength passband) and allow complete transmission of light out of the given wavelength range. Optionally, the bandpass polarizing beam splitting film 21b can be configured to allow polarization splitting of light within the wavelength passband of R, G and B lights, and allow completer transmission of light out of the wavelength passband of R, G and B lights. Correspondingly, the curved bandpass semi-reflector 31 is configured to allow reflection (for example total reflection or most reflection) of light within the wavelength passband of R, G and B lights and allow transmission or complete transmission of light out of the wavelength passband of R, G and B lights.

In the present application, any description relating to the wavelength passband of R, G and B lights can be equivalently replaced by the description relating to any one of the wavelength passband of red (R) light, the wavelength passband of green (G) light, and the wavelength passband of blue (B) light.

FIG. 3 schematically illustrates the positional relationship between the optical beam splitter substrate 21a and the bandpass polarizing beam splitting film 21b in an embodiment of the bandpass polarizing beam splitter 21. In the embodiment as illustrated, the optical beam splitter substrate 21a is arranged away from the image source 10 and the bandpass polarizing beam splitting film 21b is arranged adjacent to the image source 10. In this case, a beam splitting side of the bandpass polarizing beam splitter 21 relative to the image source 10 is defined by the bandpass polarizing beam splitting film 21b, and a transmission side of the bandpass polarizing beam splitter 21 relative to the image source 10 is defined by the optical beam splitter substrate 21a.

FIG. 4 schematically illustrates the positional relationship between the optical beam splitter substrate 21a and the bandpass polarizing beam splitting film 21b in another embodiment of the bandpass polarizing beam splitter 21. In the embodiment as illustrated, the optical beam splitter substrate 21a is adjacent to the image source 10 and the bandpass polarizing beam splitting film 21b is away from the image source 10. In this case, a beam splitting side of the bandpass polarizing beam splitter 21 relative to the image source 10 is defined by the optical beam splitter substrate 21a, and a transmission side of the bandpass polarizing beam splitter 21 relative to the image source 10 is defined by the bandpass polarizing beam splitting film 21b.

The bandpass polarizing beam splitting film 21b is attached over the optical beam splitter substrate 21a under the action of static electricity. Alternatively, they can be attached to each other by bonding, for example using a mixed curable adhesive (AB adhesive), an ultraviolet-curable adhesive (UV adhesive), an optical pressure sensitive adhesive or any other suitable means. Furthermore, as an alternative, the bandpass polarizing beam splitting film 21b can be directly hot pressed onto the optical beam splitter substrate 21a. Furthermore, as an alternative, the bandpass polarizing beam splitting film 21b can be attached on the optical beam splitter substrate 21a via a depositing manner which includes but is not limited by vacuum sputtering, ion assisted deposition, vapor deposition, thermal evaporation deposition, resistance heating evaporation deposition, electron beam evaporation deposition or any other suitable manner.

In the present application, the bandpass polarizing beam splitting film 21b can have a single-layer structure made of two material films of different refractive indices or a multi-layer structure made of single-layer structures repeatedly overlaid with each other. The operating principle of the films is mentioned below. When natural light is incident on a material of high refractive index from a material of low refractive index in a relationship satisfying the Brewster's law (i.e. at the Brewster angle), reflected light can be linearly-polarized light (for example, S-polarized light) and refracted light can be mixed light including two kinds of polarized lights perpendicularly to each other (for example, S-polarized light plus P-polarized light). Therefore, by repeated combination of material films each made of a material of low refractive index and a material of high refractive index, a multi-layer structure can be formed. When nature light is incident on the multi-layer structure in a manner satisfying the Brewster's law (i.e. at the Brewster angle), reflected light can include the S-polarized light only and transmitted light almost can included the P-polarized light only. In the multi-layer structure, greater the number of the material films is, higher the proportion of the P-polarized light in the transmitted light is. Furthermore, since the Brewster angle is relevant to the material's refractive index and the refractive index is relevant to the wavelength of light propagating in the material, the bandpass polarizing beam splitting film 21b as already mentioned can be configured by suitably forming the multi-layer structure. For instance, a thickness of each material film can be determined depending on a wavelength or an integer fraction of the wavelength of specific monochromatic light (such as red and/or green and/or blue light), such that an interference effect is achieved due to optical interference when the specific monochromatic light passes through the multi-layer structure. In this way, it ensures that the energy of the specific monochromatic light can be enhanced and an optical bandpass polarization effect can be achieved for the specific monochromatic light. In a preferable embodiment, a thickness of the bandpass polarizing beam splitting film 21b can be between 1.6 μm and 300 μm, for example between 10 μm and 100 μm. Furthermore, in the multi-layer structure of the bandpass polarizing beam splitting film 21*b*, a thickness of each material in each material film can be between 30 nm and 1 µm, and a refractive index of each material can be between 1.25 and 2.35.

Non-limiting examples are described below to explain how to form the multi-layer structure of the bandpass polarizing beam splitting film 21*b*. In an example, different material layers can be vapor-deposited on a transparent film substrate such that the layers are overlaid one with another. In this way, materials of high and low refractive indices can be alternated with each other and attached on the film substrate, so as to form the multi-layer structure of the bandpass polarizing beam splitting film 21*b*. In another example, by drawing an organic polymer material to control a refractive index of the material layer in a direction of plane, materials of different refractive indices can be formed correspondingly. For instance, a multi-layer structure of the bandpass polarizing beam splitting film 21*b* can be formed by attaching two kinds of organic polymer material layers, which have different tensile degrees and which are repeatedly overlaid with each other, on a transparent film substrate. In another example, in the multi-layer structure of the bandpass polarizing beam splitting film 21*b*, an additional material layer can be provided between a film structure and an adjacent film structure. A refractive index of the additional material layer can be equal to the refractive index of the material of low refractive index, or equal to the refractive index of the material of high refractive index, or different than the refractive indices of both of the materials of low refractive index and high refractive index.

FIGS. 5 to 7 are cross-sectional views schematically illustrating three embodiments of a bandpass polarizing beam splitting film 21*b*. In the three embodiments as shown, the bandpass polarizing beam splitter 21 includes an optical beam splitter substrate 21*a*, the bandpass polarizing beam splitting film 21*b* and a polarizing film 21*c*. In the present application, the polarizing film is such a film through which polarized light in a direction is able to pass and polarized light in another direction perpendicular to the one direction is able to be absorbed. In the shown embodiments, the polarizing film 21*c* can be for example configured such that P-polarized light can pass therethrough and S-polarized light can be absorbed. The polarizing film 21*c* can be attached to the bandpass polarizing beam splitting film 21*b* or the optical beam splitter substrate 21*a* in a manner similar to the bandpass polarizing beam splitting film 21*b* on the optical beam splitter substrate 21*a* as previously mentioned.

In an embodiment shown by FIG. 5, the bandpass polarizing beam splitting film 21*b* is located at a side of the optical beam splitter substrate 21*a* adjacent to the image source 10, and the polarizing film 21*c* is located at a side of the optical beam splitter substrate 21*a* away from the image source 10. In this case, a beam splitting side of the bandpass polarizing beam splitter 21 relative to the image source 10 is defined by the bandpass polarizing beam splitting film 21*b*, and a transmission side of the bandpass polarizing beam splitter 21 relative to the image source 10 is defined by the polarizing film 21*c*.

In an embodiment shown by FIG. 6, the polarizing film 21*c* is located between the optical beam splitter substrate 21*a* and the bandpass polarizing beam splitting film 21*b* such that the bandpass polarizing beam splitting film 21*b* is adjacent to the image source 10, and the optical beam splitter substrate 21*a* is away from the image source 10. In this case, a beam splitting side of the bandpass polarizing beam splitter 21 relative to the image source 10 is defined by the bandpass polarizing beam splitting film 21*b*, and a transmission side of the bandpass polarizing beam splitter 21 relative to the image source 10 is defined by the optical beam splitter substrate 21*a*.

In an embodiment shown by FIG. 7, the bandpass polarizing beam splitting film 21*b* is located between the optical beam splitter substrate 21*a* and the polarizing film 21*c* such that the optical beam splitter substrate 21*a* is adjacent to the image source 10 and the polarizing film 21*c* is away from the image source 10. In this case, a beam splitting side of the bandpass polarizing beam splitter 21 relative to the image source 10 is defined by the optical beam splitter substrate 21*a*, and a transmission side of the bandpass polarizing beam splitter 21 relative to the image source 10 is defined by the polarizing film 21*c*.

The curved bandpass semi-reflector 31 can be manufactured in a manner similar to the bandpass polarizing beam splitter 21. The curved bandpass semi-reflector 31 includes a curved optical semi-reflector substrate 31*a* and a bandpass semi-reflective film 31*b* attached to the curved optical semi-reflector substrate 31*a*. For instance, the bandpass semi-reflective film can be attached on the curved optical reflector substrate in a manner similar to a way of attaching the bandpass polarizing beam splitting film 21*b* on the optical beam splitter substrate 21*a*. The bandpass semi-reflective film 31*b* can be formed in a manner similar to the bandpass polarizing beam splitting film 21*b*. For example, the bandpass semi-reflective film has at least a (multi-layer) film structure including two kinds of material films of different refractive indices which are (repeatedly) overlaid with each other. That is to say, the film structure of the bandpass semi-reflective film 31*b* includes two kinds of material layers of different refractive indices or the material layers are overlaid with each other, such that in each lamination a material layer of low refractive index is more adjacent to the bandpass polarizing beam splitter 21 or the wave plate 60 and a material layer of high refractive index is away from the bandpass polarizing beam splitter 21 or the wave plate 60. In this way, the bandpass semi-reflective film 31*b* corresponds to the bandpass polarizing beam splitting film 21*b*, such that light in the wavelength passband (the passband widths of R, G and B lights) processed by the bandpass polarizing beam splitting film 21*b* can be reflected (for example totally reflected or most reflected) and light out of the wavelength passband can be transmitted or totally transmitted through the bandpass semi-reflective film. According to another example, in a multi-layer structure of the bandpass semi-reflective film 31*b*, an additional material layer can be provided between a material film structure and another adjacent material film structure. The additional material layer has a refractive index which can be equal to the refractive index of the material layer of low refractive index, or equal to the refractive index of the material layer of high refractive index, or different than the refractive indices of both of the materials of low and high refractive indices.

FIG. 8 schematically illustrates the positional relationship between a semi-reflector substrate 31*a* and a bandpass semi-reflective film 31*b* in an embodiment of the curved bandpass semi-reflector 31. In the embodiment as shown, the semi-reflector substrate 31*a* is adjacent to the bandpass polarizing beam splitter 21 or the wave plate 60, and the bandpass semi-reflective film 31*b* is away from the bandpass polarizing beam splitter 21 or the wave plate 60. FIG. 9 schematically illustrates the positional relationship between a semi-reflector substrate 31*a* and a bandpass semi-reflective film 31*b* in another embodiment of the curved bandpass semi-reflector 31. In the embodiment as shown, the bandpass semi-reflective film 31b is adjacent to the bandpass polarizing beam splitter 21 or the wave plate 60, and the semi-reflector substrate 31a is away from the bandpass polarizing beam splitter 21 or the wave plate 60.

FIGS. 10 to 13 are cross-sectional views which schematically illustrate three embodiments of the curved bandpass semi-reflector 31. In the four embodiments as shown, besides the semi-reflector substrate 31a and the bandpass semi-reflective film 31b, the curved bandpass semi-reflector 31 also includes an anti-reflective film 31c. The anti-reflective film is mainly used to improve the energy of light entering an optical device so as to enhance the efficiency of energy utilization of light modulated by refraction and reflection. The anti-reflective film 31c can be located at a proximal side of the curved bandpass semi-reflector 31, or alternatively can be located at a distal side of the curved bandpass semi-reflector 31. It should be understood that the anti-reflective film 31c can be provided on the curved bandpass semi-reflector 31 in any suitable manner used in film combination as already mentioned. In the optical system of the present application, the proximal side of the curved bandpass semi-reflector 31 or its constituent part means a side adjacent to the human eye 40, and the distal side of the curved bandpass semi-reflector 31 or its constituent part means a side away from the human eye 40.

In the embodiment shown by FIG. 10, the bandpass semi-reflective film 31b is located at a proximal side of the semi-reflector substrate 31a and the anti-reflective film 31c is located at a distal side of the semi-reflector substrate 31a. Therefore, the bandpass semi-reflective film 31b is adjacent to the bandpass polarizing beam splitter 21 or the wave plate 60, and the anti-reflective film 31c is away from the bandpass polarizing beam splitter 21 or the wave plate 60. In the embodiment shown by FIG. 11, the bandpass semi-reflective film 31b is located at a distal side of the semi-reflector substrate 31a and the anti-reflective film 31c is located at a proximal side of the semi-reflector substrate 31a. Therefore, the bandpass semi-reflective film 31b is away from the bandpass polarizing beam splitter 21 or the wave plate 60. In the embodiment shown by FIG. 12, the anti-reflective film 31c is located at the distal side of the semi-reflector substrate 31a and the bandpass semi-reflective film 31b is located at a distal side of the anti-reflective film 31c such that the semi-reflector substrate 31a is adjacent to the bandpass polarizing beam splitter 21 or the wave plate 60 and the bandpass semi-reflective film 31b is away from the bandpass polarizing beam splitter 21 or the wave plate 60. In the embodiment shown by FIG. 13, the bandpass semi-reflective film 31b is located at the proximal side of the semi-reflector substrate 31a and the anti-reflective film 31c is located at a proximal side of the bandpass semi-reflective film 31b. Therefore, the anti-reflective film 31c is adjacent to the bandpass polarizing beam splitter 21 or the wave plate 60, and the semi-reflector substrate 31a is away from the bandpass polarizing beam splitter 21 or the wave plate 60.

FIGS. 14 to 16 schematically illustrate characteristic diagrams of light of different wavelengths for bandpass polarizing beam splitting films designed according to the present application. As shown, the light transmittance of the bandpass polarizing beam splitting film can be 80% or more with the efficiency of energy utilization of the light from the image source be not greatly changed. It approves that the AR apparatus according to the present application is able to provide improved light permeability enabling the user's eyes to see the real-world environment. FIG. 17 schematically illustrates a characteristic diagram of light of different wavelengths for a bandpass polarizing beam splitting film designed according to the present application. As shown, the light transmittance of the bandpass semi-reflective film can be 70% or more. With cooperation between the bandpass semi-reflective film, the bandpass polarizing beam splitting film, as well as the wave plate, the efficiency of energy utilization of the light from the image source can be increased and improved light permeability enabling the user's eyes to see the real-world environment can be provided.

According to the present application, in order to increase the efficiency of energy utilization of the light and thus further prevent leakage of the light of the image source through the semi-reflector, so as to enhance privacy, the image source can be a narrow-band image source. For example, the image source can emit light whose wavelength mainly concentrates in a wavelength range of R, G, and B lights, as shown by FIG. 18. For instance, a full width at half maxima of the light emitted from the narrow-band image source is less than 80 nm. In a preferred embodiment, the full width at half maxima of the light emitted from the narrow-band image source is less than 40 nm. In a preferred embodiment, the full width at half maxima of the light emitted from the narrow-band image source is less than 20 nm. In a preferred embodiment, the full width at half maxima of the light emitted from the narrow-band image source is less than 1 nm. The term "full width at half maxima" refers to a width of a crest at half the height thereof in energy density spectrum. Therefore, the light emitted from the narrow-band image source/the image source is concentrated in the wavelength range of R, G, and B lights, so as to increase the efficiency of energy utilization of the light. Moreover, it is also feasible to shorten the passband width of the bandpass polarizing beam splitting film and the bandpass semi-reflective film, so as to further improve the light permeability and enhance the apparatus's privacy.

According to the present application, the image source 10 can include an image source and a beam shaping element. The beam shaping element is arranged in a light path of the light emitted from the image source, to collimate, shape and/or combine the light emitted from the image source. According to the present application, the beam shaping element can be configured as a lens. The lens for forming the beam shaping element of the present application can be a single lens or a lens set including lenses. The lens or each lens of the lens set can be a convex lens, a concave lens or any combination of them or the like. A surface of the lens can be spherical, aspherical, freely-curved or the like.

According to the present application's principles, the beam shaping element can be directly integrated into the image source in a manner of direct surface-fitting through adhesion or the like, or integrated into the image source via an intermediate matching part. In other words, an image source unit and the beam shaping element of the image source of the AR apparatus according to the present application can be an integrated piece which is directly integrated or indirectly integrated by the intermediate matching part. The intermediate matching part is formed by such a matching medium which is not air and has a refractive index greater than 1. In this way, light beams VL emitted from the image source and carrying virtual image information can enter the beam shaping element directly or through the matching medium having the refractive index greater than 1. Thereafter, the light beams are emitted out of the image source through the beam shaping element.

In an optional embodiment, the refractive index of the matching medium for forming the intermediate matching part can be between 1 and 2.7. The matching medium for forming the intermediate matching part can be a liquid medium, a liquid crystal medium, a semi-solid medium or a solid medium. The intermediate matching part can be formed by at least one of the mentioned mediums. The liquid medium can be a transparent medium such as water or ethyl alcohol. The solid medium can be a transparent solid medium such as glass or resin.

In an embodiment, the image source and the beam shaping element are indirectly integrated together through the intermediate matching part. The beam shaping element is provided as a lens. The intermediate matching part is formed by a liquid and/or liquid crystal medium. Therefore, the image source 10 includes a seal structure by which the liquid and/or liquid crystal medium can be sealed between the image source and the beam shaping element. The seal structure can be any suitable seal structure well known in the art.

In a feasible embodiment, the seal structure includes a seal frame. The seal frame is adhered to the image source to achieve seal therebetween. Seal between the seal frame and the lens of the beam shaping element can be achieved by inlay engagement therebetween. Optionally, depending on which kind of medium is used to form the intermediate matching part, the seal frame can be adhered to the lens of the beam shaping element.

According to such configuration, light beams emitted from the image source and carrying virtual image can enter first the intermediate matching part and then the beam shaping element which is in the form of the lens. As the refractive index of the matching medium is greater than that of air, at an interface between the intermediate matching part and the beam shaping element, a difference between refractive indexes of the medium, by which the lens of the beam shaping element is formed, and the refractive index of the matching medium, is less than a difference between a refractive index of the medium, by which the lens of the beam shaping element is formed, and the refractive index of air. Therefore, more light beams can be refracted such that light transmittance can be improved, and the optical efficiency of the image source can be increased. Consequently, less light beams can be reflected at the interface such that stray light can be restrained and ghost image can be reduced.

It is observed from an equation $R=(0.61*\lambda)/(n*\sin\theta)$, in which R represents a radius of an Airy disc, $\lambda$ represents the wavelength of light, n represents the refractive index in image space and $\theta$ represents the incidence aperture angle, that the greater the refractive index of the matching medium becomes, the smaller the produced Airy disc becomes. Therefore, the imaging resolution can be increased. Furthermore, because the refractive index becomes greater at the imaging side, a larger numerical aperture can be obtained with a relatively smaller aperture angle and the bending angle of marginal light beams can be reduced, which results in less design difficulty. Moreover, since the image source is integrated together with the beam shaping element, the optical structure is more compact and more easily installed and adjusted, and thus is more systemic.

The AR apparatus of the present application includes but is not limited by at least one of the following advantages.
1. In comparison with a conventional AR apparatus, the shortcoming of low light transmittance relating to that the user observes the real-world environment can be overcome with the efficiency of energy utilization of the light emitted from the image source almost remaining substantially unchanged.
2. The phenomenon that the light emitted from the image source shoots out of the semi-reflector side can be completely eliminated, such that the privacy can be drastically enhanced.
3. As a narrow-band image source is adapted as the image source/light source unit, waste of light energy can be reduced and thus the efficiency of energy utilization of the light can be improved.
4. Eyes of a user who wears the AR apparatus can be more clearly watched by eyes of a person standing in the real-world environment, so as to improve interactivity between them.

For instance, the AR apparatus can include a holder. The optical system of the present application is integrated in the holder. For a head-mounted AR apparatus, the holder can be a spectacle frame. In this way, the optical system can be integrated in the spectacle frame so as to constitute a visual imaging part of the AR apparatus.

In the embodiments of the present application, the wave plate 60 can be a retarder film integrated together with the curved bandpass semi-reflector 31 at a proximal side of the curved bandpass semi-reflector 31. In a preferred embodiment, the retarder film or wave plate 60 is a quarter-retarder film or quarter-wave plate. It should be understood by a person of ordinary skill in the art, after reading the description of the present application, that although the quarter-retarder film or the quarter-wave plate has been described, any other suitable wave plate or retarder film or optical device, which can enable additional optical path difference to exist between two kinds of polarized light which are perpendicular to each other, can be applied for the present application as long as the wave plate or retarder film or optical device can achieve or substantially achieve functions of the technical solutions of the present application.

Furthermore, it should be noticed that in the context of the present application, the beam splitter (or its substrate) can be cubic or planar. For instance, in a cubic beam splitter including two right angled isosceles triangle prisms, a bevel of the prism constitutes a beam-splitting side of the beam splitter. For instance again, in a planar beam splitter, a planar surface of the beam splitter's planar substrate constitutes a beam splitting side of the beam splitter.

It should be understood that in the description of the embodiments of the present application, the terms "install", "connect" and "couple" shall be understood in a broad sense, except as otherwise noted. For instance, a connection may be a fixed connection, or a releasable connection, or an integral connection, or a mechanical connection, or a direct connection, or an indirect connection via an intermediate matching part, or internal connection between two elements. It should be noticed by a person of ordinary skill in the art that the concrete meaning of the terms in the present application can be understood on a case-by-case basis.

It should be noticed that in the description of the present application the terms "center", "up", "down", "left", "right", "vertical", "perpendicular", "inner", "outer" are used to indicate oriental or positional relations on the basis of the attached drawings, and they are given for the purpose of conveniently and simply describing the present application and do not denote or imply that a device or element must be specifically oriented or be configured or operate in a given orientation, and they cannot be understood to constrain the present application. Furthermore, the terms "first", "second", and "third" are given for illustrative purposes only, and cannot be understood to denote or imply their relative importance.

In the context of the present application, the embodiments can be arbitrarily combined with each other. Although the concrete embodiments of the present application have been described here in details, they cannot be deemed to constrain the scope of the present application. Without departing from the spirit and scope of the present application, various alternations, replacements and modifications can be thought out.

The invention claimed is:

1. An optical system for an augmented reality apparatus, comprising:
    an image source;
    a bandpass polarizing beam splitter, relative to the image source, defining a beam splitting side adjacent to the image source and a transmission side facing away from the image source, the bandpass polarizing beam splitter being configured to perform polarization splitting on light incident thereon in a given wavelength range and allow transmission of light out of the given wavelength range;
    a wave plate adjacent to the beam splitting side, and the beam splitter being configured to allow light emitted from the image source to be non-perpendicularly incident on the beam splitting side and be at least partially reflected towards the wave plate; and
    a curved bandpass semi-reflector located downstream of the wave plate in a path of reflected light and configured to allow reflection of light incident on the curved bandpass semi-reflector in the given wavelength range and allow transmission of light out of the given wavelength range,
    wherein the bandpass polarizing beam splitter comprises a planar optical beam splitter substrate and a bandpass polarizing beam splitting film attached on the planar optical beam splitter substrate, wherein the bandpass polarizing beam splitting film comprises a single-layer structure made of two material films of different refractive indices or a multi-layer structure made of single-layer structures repeatedly overlaid with each other.

2. The optical system as recited in claim 1, wherein the bandpass polarizing beam splitter is configured to enable that after the light emitted from the image source is incident on the beam splitting side, a polarized light component having a polarized state in a first direction in the given wavelength range is reflected from the beam splitting side towards the wave plate, and a polarized light component having a polarized state in a second direction, perpendicular to the first direction, in the given wavelength range is transmitted through the bandpass polarizing beam splitter from the transmission side.

3. The optical system as recited in claim 1, wherein the given wavelength range comprises at least one of a wavelength range of red (R) light, a wavelength range of green (G) light, and a wavelength range of blue (B) light.

4. The optical system as recited in claim 1, wherein the bandpass polarizing beam splitter comprises a beam splitter substrate and a bandpass polarizing beam splitting film attached on the beam splitter substrate, the bandpass polarizing beam splitting film is configured to perform polarization splitting on light incident thereon in the given wavelength range and allow transmission of light out of the given wavelength range, and wherein the bandpass polarizing beam splitting film has one or more film structures which are overlaid with each other.

5. The optical system as recited in claim 4, wherein each film structure comprises a first material layer of a first refractive index and a second material layer of a second refractive index, the first refractive index is lower than the second refractive index, and wherein the first material layer is adjacent to the image source, and the second material layer is away from the image source.

6. The optical system as recited in claim 4, wherein the bandpass polarizing beam splitter also comprises a polarizing film attached on at least one of the beam splitter substrate and the bandpass polarizing beam splitting film.

7. The optical system as recited in claim 6, wherein the optical system is configured as one of:
    a first configuration, wherein the beam splitting side is defined by the bandpass polarizing beam splitting film and the transmission side is defined by the beam splitter substrate; and
    a second configuration, wherein the beam splitting side is defined by the beam splitter substrate and the transmission side is defined by the bandpass polarizing beam splitting film.

8. The optical system as recited in claim 1, wherein the optical system is configured as one of:
    a first configuration, wherein the beam splitter substrate is located between the bandpass polarizing beam splitting film and the polarizing film, the beam splitting side is defined by the bandpass polarizing beam splitting film and the transmission side is defined by the polarizing film;
    a second configuration, wherein the polarizing film is located between the bandpass polarizing beam splitting film and the beam splitter substrate, the beam splitting side is defined by the bandpass polarizing beam splitting film and the transmission side is defined by the beam splitter substrate; and
    a third configuration, wherein the bandpass polarizing beam splitting film is located between the beam splitter substrate and the polarizing film, the beam splitting side is defined by the beam splitter substrate and the transmission side is defined by the polarizing film.

9. The optical system as recited in claim 1, wherein the curved bandpass semi-reflector comprises a semi-reflector substrate and a bandpass semi-reflective film attached on the semi-reflector substrate, the bandpass semi-reflective film is configured to allow total or most reflection of light incident thereon in the given wavelength range and allow transmission of light out of the given wavelength range, and wherein the bandpass semi-reflective film has at least one film structure.

10. The optical system as recited in claim 9, wherein the film structure comprises a third material layer of a third refractive index and a fourth material layer of a fourth refractive index, the third refractive index is lower than the fourth refractive index, the third material layer is adjacent to the beam splitter or the wave plate, and the fourth material layer is away from the beam splitter or the wave plate.

11. The optical system as recited in claim 10, wherein the optical system is configured as one of:
    a first configuration, wherein the semi-reflector substrate defines a proximal side of the curved bandpass semi-reflector, and the bandpass semi-reflective film defines a distal side of the curved bandpass semi-reflector; and
    a second configuration, wherein the semi-reflector substrate defines a distal side of the curved bandpass semi-reflector and the bandpass semi-reflective film defines a proximal side of the curved bandpass semi-reflector.

12. The optical system as recited in claim 11, wherein the curved bandpass semi-reflector also comprises an anti-reflective film attached on at least one of the semi-reflector substrate and the bandpass semi-reflective film, and wherein the semi-reflector substrate is located between the bandpass semi-reflective film and the anti-reflective film, one of the bandpass semi-reflective film and the anti-reflective film defines the distal side of the curved bandpass semi-reflector, and the other defines the proximal side of the curved bandpass semi-reflector.

13. The optical system as recited in claim 12, wherein the optical system is configured as one of:
a first configuration, wherein the anti-reflective film is located between the semi-reflector substrate and the bandpass semi-reflective film, the semi-reflector substrate defines the proximal side of the curved bandpass semi-reflector, and the bandpass semi-reflective film defines the distal side of the curved bandpass semi-reflector; and
a second configuration, wherein the bandpass semi-reflective film is located between the anti-reflective film and the semi-reflector substrate, the anti-reflective film defines the proximal side of the curved bandpass semi-reflector, and the semi-reflector substrate defines the distal side of the curved bandpass semi-reflector.

14. The optical system as recited in claim 1, wherein the wave plate is a retarder film integrated on the proximal side of the curved bandpass semi-reflector, and the wave plate or retarder film is a quarter-wave plate or retarder film.

15. The optical system as recited in claim 1, wherein the optical system is configured as one of:
a first configuration, wherein the image source comprises a narrow-band image source whose full width at half maxima is less than 80 nm;
a second configuration, wherein the image source comprises a narrow-band image source whose full width at half maxima is less than 40 nm;
a third configuration, wherein the image source comprises a narrow-band image source whose full width at half maxima is less than 20 nm; and
a fourth configuration, wherein the image source comprises a narrow-band image source whose full width at half maxima is less than 1 nm.

16. The optical system as recited in claim 5, wherein the optical system is configured as at least one of:
a first configuration, wherein the bandpass polarizing beam splitting film has a thickness between 10 μm and 100 μm; and
a second configuration, wherein the first material layer and the second material layer in each film structure of the bandpass polarizing beam splitting film has a thickness between 30 nm and 1 μm, and a refractive index of a material in each layer is between 1.25 and 2.35.

17. An augmented reality apparatus, comprising:
a holder; and
an optical system integrated in the holder and comprising:
an image source;
a bandpass polarizing beam splitter, relative to the image source, defining a beam splitting side adjacent to the image source and a transmission side facing away from the image source, the bandpass polarizing beam splitter being configured to perform polarization splitting on light incident thereon in a given wavelength range and allow transmission of light out of the given wavelength range, the bandpass polarizing beam splitter comprising a beam splitter substrate and a bandpass polarizing beam splitting film attached on the beam splitter substrate, each film structure comprising a first material layer of a first refractive index and a second material layer of a second refractive index, the first refractive index being lower than the second refractive index, and the first material layer being adjacent to the image source, and the second material layer being away from the image source;
a wave plate adjacent to the beam splitting side, and the beam splitter being configured to allow light emitted from the image source to be non-perpendicularly incident on the beam splitting side and be at least partially reflected towards the wave plate; and
a curved bandpass semi-reflector located downstream of the wave plate in a path of reflected light and configured to allow reflection of light incident on the curved bandpass semi-reflector in the given wavelength range and allow transmission of light out of the given wavelength range, the curved bandpass semi-reflector comprising a semi-reflector substrate and a bandpass semi-reflective film attached on the semi-reflector substrate, the film structure comprising a third material layer of a third refractive index and a fourth material layer of a fourth refractive index, the third refractive index being lower than the fourth refractive index, the third material layer being adjacent to the bandpass polarizing beam splitter or the wave plate, and the fourth material layer being away from the bandpass polarizing beam splitter or the wave plate.

18. The augmented reality apparatus as recited in claim 17, wherein the augmented reality apparatus is configured as a head-mounted augmented reality apparatus, and the holder is a spectacle frame.

19. An optical system for an augmented reality apparatus, comprising:
an image source;
a bandpass polarizing beam splitter, relative to the image source, defining a beam splitting side adjacent to the image source and a transmission side facing away from the image source, the bandpass polarizing beam splitter being configured to perform polarization splitting on light incident thereon in a given wavelength range and allow transmission of light out of the given wavelength range, the bandpass polarizing beam splitter comprising a beam splitter substrate and a bandpass polarizing beam splitting film attached on the beam splitter substrate, each film structure comprising a first material layer of a first refractive index and a second material layer of a second refractive index, the first refractive index being lower than the second refractive index, and the first material layer being adjacent to the image source, and the second material layer being away from the image source, a thickness of each of the first material layer and the second material layer being determined depending on a wavelength or an integer fraction of at least one of a wavelength of red light, a wavelength of green light, and a wavelength of blue light;
a wave plate adjacent to the beam splitting side, and the beam splitter being configured to allow light emitted from the image source to be non-perpendicularly incident on the beam splitting side and be at least partially reflected towards the wave plate; and
a curved bandpass semi-reflector located downstream of the wave plate in a path of reflected light and configured to allow reflection of light incident on the curved bandpass semi-reflector in the given wavelength range and allow transmission of light out of the given wavelength range.

20. The optical system as recited in claim 19, wherein the beam splitter substrate is a transparent film substrate, and the first material layer and the second material layer are overlaid one with another on the transparent film substrate.

\* \* \* \* \*